(12) United States Patent
Bolain

(10) Patent No.: US 7,530,824 B2
(45) Date of Patent: May 12, 2009

(54) LOCKING SEAL FOR DATA PORTS AND ASSOCIATED METHODS

(75) Inventor: James L. Bolain, Ocala, FL (US)

(73) Assignee: Padjack, Inc., Silver Springs, FL (US)

( * ) Notice: Subject to any disclaimer, the term of this patent is extended or adjusted under 35 U.S.C. 154(b) by 0 days.

(21) Appl. No.: 11/844,388

(22) Filed: Aug. 24, 2007

(65) Prior Publication Data

US 2008/0057759 A1 Mar. 6, 2008

Related U.S. Application Data

(60) Provisional application No. 60/824,518, filed on Sep. 5, 2006, provisional application No. 60/938,060, filed on May 15, 2007.

(51) Int. Cl.
*H01R 13/69* (2006.01)

(52) U.S. Cl. .................................................. 439/147

(58) Field of Classification Search ............. 439/147, 439/301, 304, 353, 354, 344, 133, 134, 676, 439/638; 385/55; 340/568.4; 379/435
See application file for complete search history.

(56) References Cited

U.S. PATENT DOCUMENTS

| | | | |
|---|---|---|---|
| 1,726,166 A | 8/1929 | Sparks | |
| 4,311,883 A | 1/1982 | Kidney | |
| 4,443,907 A | 4/1984 | Chamberlain | |
| 4,615,575 A | 10/1986 | Kossor | |
| 4,647,726 A | 3/1987 | Blum | |
| 4,740,168 A | 4/1988 | Carney et al. | |
| 4,840,582 A | 6/1989 | Marson | |
| 4,862,500 A | 8/1989 | May | |
| 4,964,284 A | 10/1990 | McDaid | |
| 5,090,916 A * | 2/1992 | Magnier | 439/352 |
| 5,429,522 A | 7/1995 | Noschese et al. | |
| 5,556,295 A * | 9/1996 | McFadden et al. | 439/301 |
| 5,692,925 A | 12/1997 | Bogese, II | |
| 6,067,014 A | 5/2000 | Wilson | |
| 6,080,001 A | 6/2000 | Wong | |
| 6,459,374 B1 | 10/2002 | Rand et al. | |
| 6,851,957 B1 | 2/2005 | Bhogal et al. | |
| 2004/0032329 A1 | 2/2004 | DeConinck et al. | |
| 2005/0174238 A1 | 8/2005 | Foseide | |
| 2006/0140543 A1* | 6/2006 | Abendschein et al. | 385/55 |

* cited by examiner

*Primary Examiner*—Alexander Gilman
(74) *Attorney, Agent, or Firm*—Jacqueline E. Hartt; Lowndes Drosdick Doster Kantor & Reed, P.A.

(57) ABSTRACT

A jack port locking device includes a base having side longitudinal slots. A protrusion extends upwardly into the slot. The base's top is compressible between a released and a compressed position. A ramp slopes upward from the front end. A stop higher than the ramp is positioned rearward of the ramp. A front portion of the device in the compressed position is dimensioned for insertion into a port so that the ramp is retained within the port when the device is in the released position. When the device is retained within the port, the protrusion prevents sufficient compression to remove the device from the port, and the stop is positioned to prevent access into the port. Preferably, the device is removable only by destroying the device's integrity. The device may have an electronically pollable sensor for detecting the device's presence in a port over a network.

20 Claims, 2 Drawing Sheets

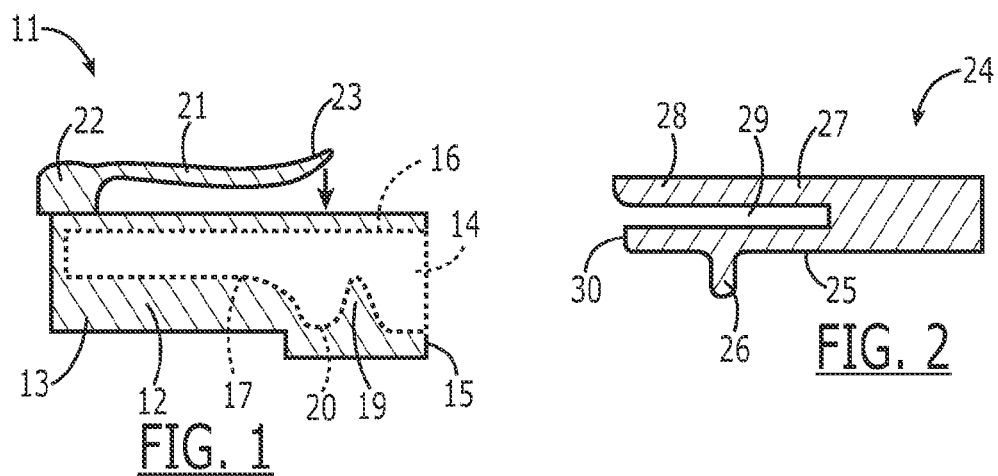
FIG. 1
FIG. 2
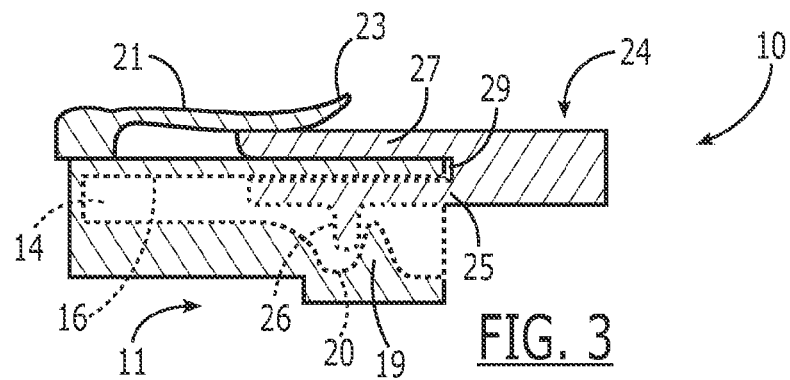
FIG. 3
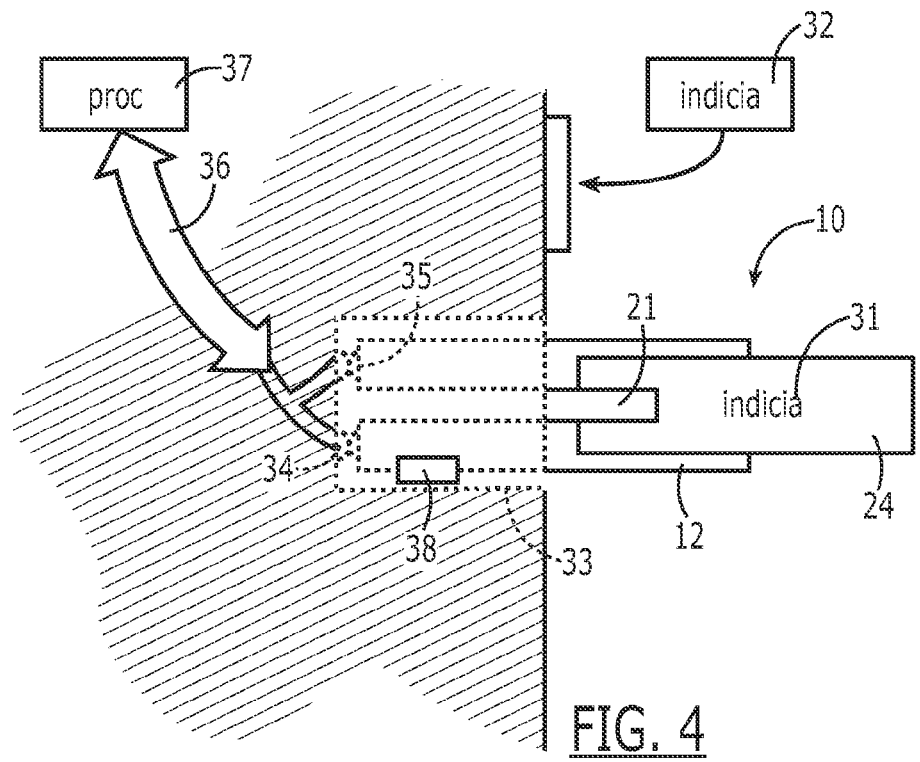
FIG. 4

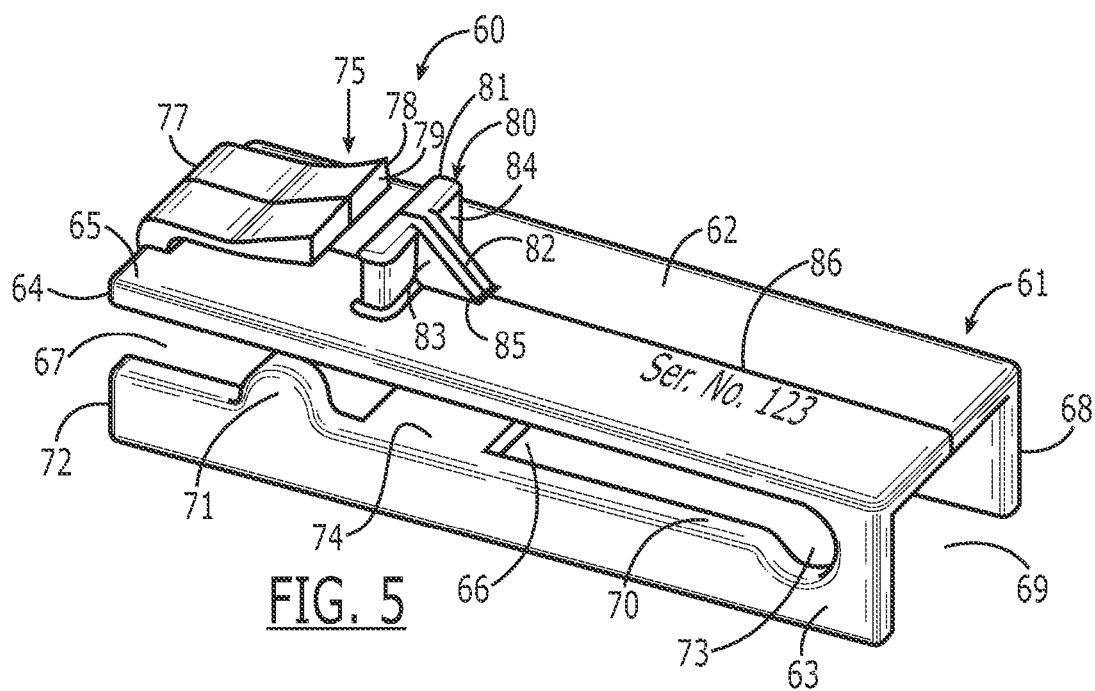
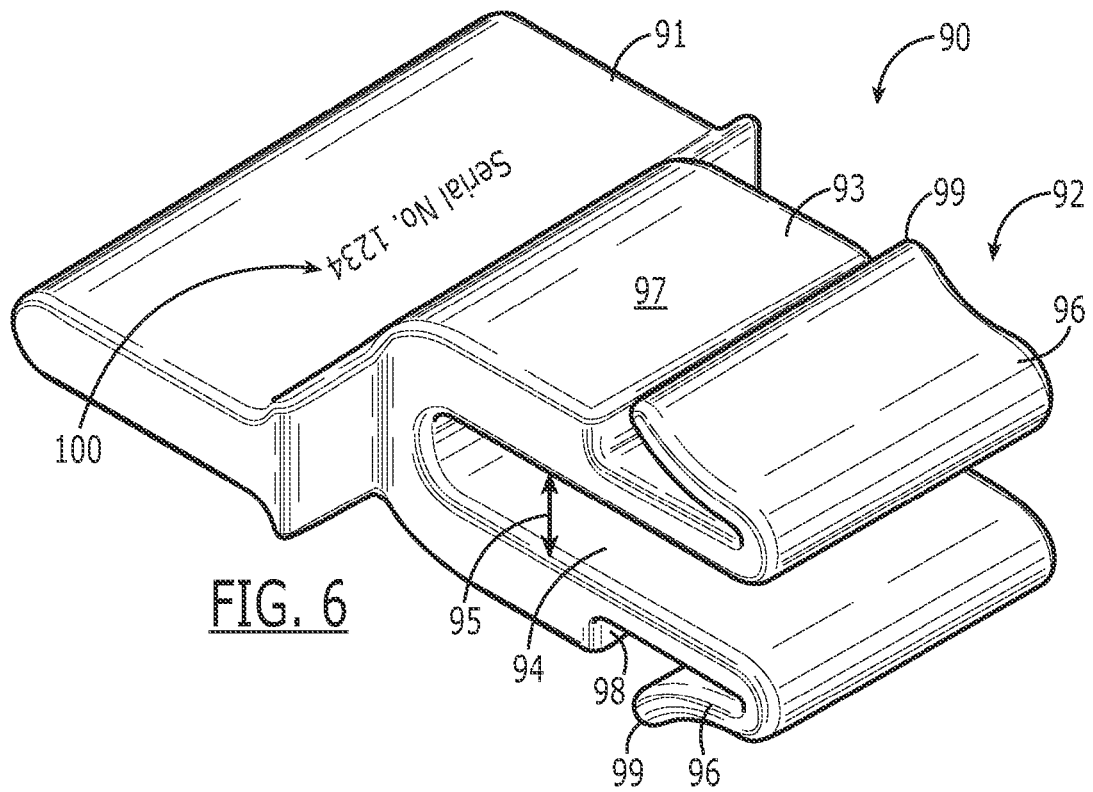

LOCKING SEAL FOR DATA PORTS AND ASSOCIATED METHODS

CROSS-REFERENCE TO RELATED APPLICATIONS

This application claims priority to provisional applications Ser. No. 60/824,518, filed Sep. 5, 2006, and Ser. No. 60/938,060, filed May 15, 2007.

BACKGROUND OF THE INVENTION

1. Field of the Invention

The present invention relates to devices and methods for securing access to data and telephone lines, and, more particularly, to such devices and methods for securing access to data via data ports and to telephone lines via telephone jacks.

2. Description of Related Art

Data ports are frequently sprinkled about business sites for ease of access. However, the proliferation of such ports can provide the possibility of a security breach into a site network. Further, telephone jacks can also be situated for ease of use by authorized personnel, but may be desired to be protected from unauthorized use.

Therefore, it would be desirable to provide a device and system for limiting access to data ports and telephone jacks, and to determine whether security into those ports has been breached.

SUMMARY OF THE INVENTION

The present invention is directed in one aspect to a device for limiting access into a jack port. The jack port can include, for example, a telephone jack port or a data port. The device can comprise a jack body that has a plug section having a distal portion that is dimensioned for insertion into a jack port. The plug section has an aperture thereinto that extends from a proximal end and is defined by an upper wall and a lower wall. A protrusion extends into the aperture from the lower wall and is positioned in spaced relation from the proximal end.

The jack body further has a spring element that has a distal end affixed to the plug section's distal portion and a proximal end extending above the plug section's distal portion. The spring element is dimensioned for snapping into an upper section of the jack port and for, upon a depression thereof, releasing the plug section from the jack port.

A locking body has a lower section that has a protrusion extending from a bottom face thereof and is dimensioned for insertion into the jack body's aperture. An upper section is dimensioned so that a distal portion thereof is extendible between the jack body's plug section and the spring element's proximal end. The upper section is also dimensioned so that, when so positioned, a depression of the spring element sufficient to release the plug section from the jack port is prevented. A notch extends from a distal end between the lower section and the upper section and is dimensioned to admit the plug section's upper wall.

In use, the locking body's lower section is insertable into the plug section's aperture, and the lower section's protrusion is snappable over the plug portion's protrusion so as to prevent a removal of the locking body from the plug section's aperture. In this position, the notch is positioned to encompass a portion of the plug section's upper wall and the locking body's upper section is positionable between the plug section's upper wall and the spring element, so as to prevent a removal of the plug section from a jack port.

A method is also provided for using the device of the present invention wherein the device is positioned into a jack port desired to be protected from unauthorized entry. The device has affixed thereto or imprinted thereon unique indicia so that, if the device is destroyed upon an unauthorized removal from the jack port, a reconstruction of the device is not possible, and the removal is detectable. The device may also have operatively associated therewith an electronically pollable sensor for detecting a presence of the device in a jack port over a network.

In a second embodiment, the device comprises a base having a top and two sides. Each side has an upper edge meeting a side edge of the top and a longitudinal slot therein open at a front end and terminating forward of a rear edge of the respective side. Each slot communicates with a base inner space defined by the top and two sides and has a bottom edge that is substantially parallel with the respective side upper edge. A protrusion extends upwardly from the slot's bottom edge into the slot in spaced relation from the respective side front edge. The top is downwardly compressible relative to the sides so that the slot has a first width in a released position and a second width less than the first width in a compressed position.

A ramped element is atop the base top and has a first height at a front end joined to the base top adjacent a front edge thereof and a second height rearward of the front edge. The second height is greater than the first height, and the back end is substantially aligned vertically with the slot protrusion.

A stop element is also atop the base top. The stop element has a third height greater than the second height, and is positioned rearward of and in spaced relation from the ramped element.

A front portion of the device in the compressed position is dimensioned for insertion into a target port to a sufficient distance that the ramped element is retained within the port when device is in the released position. When the device is retained within the port, the slot's upward protrusion prevents sufficient slot compression to remove the device from the port, and the stop element is positioned to prevent access into the port. Preferably, the device is removable from the port only by destroying the device's integrity.

A third embodiment comprises a base, the shape of which is substantially irrelevant. A distal portion comprises a dual-prong element having a generally "U" shape in side cross-section, with outwardly flaring wings. The prong element and the wings together are dimensioned and have sufficient compressibility for insertion into a jack port, and are biased to open upon entering the port, so that the wings retain the device within the port like a barb. The device then cannot be removed from the port without being broken. A serial number can again be provided for tracking purposes.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 1 is a side view of the plug section of a first embodiment of the device.

FIG. 2 is a side view of the locking body of the device of FIG. 1.

FIG. 3 is a side view of the locking body of FIG. 2 joined with the plug section.

FIG. 4 is top plan view of a matching device and jack port.

FIG. 5 is a top/side perspective view of a second embodiment of a locking body.

FIG. 6 is a top/side perspective view of a third embodiment of the device.

DETAILED DESCRIPTION OF THE PREFERRED EMBODIMENTS

A description of the preferred embodiments of the present invention will now be presented with reference to FIGS. 1-6.

A device 10 for limiting access into a jack port 33 is provided. The jack port 33 can include, for example, a telephone jack port or a data port, although these are not intended as limitations. The type of jack port 33 envisioned in a preferred embodiment of the invention includes those such as known in the art having an aperture thereinto shaped as a rectangle with an upper notch for admitting a retaining/releasing spring element.

The device 10 can comprise a jack body 11 (FIG. 1) that has a plug section 12 having a distal portion 13 that is dimensioned for insertion into a jack port 33. Contacts 34 in the jack port 33 are positioned for making contact with contacts 35 on the jack body 11 for passing signals therebetween. The plug section 12 has an aperture 14 thereinto that extends from a proximal end 15 and is defined by an upper wall 16, a lower wall 17, and two side walls. A protrusion, such as an upwardly extending ridge 19 that is perpendicular to the longitudinal axis, extends into the aperture 14 from the lower wall 17 and is positioned in spaced relation from the proximal end 15. A valley 20 is positioned distal of the ridge 19 and is substantially parallel to the ridge 19.

The jack body 11 further has a spring element 21 that has a distal end 22 affixed to the plug section's distal portion 13 and a proximal end 23 that extends above the plug section's distal portion 13. The spring element 21 is dimensioned for snapping into the upper notch of the jack port 33 and for, upon a depression thereof, releasing the plug section 12 from the jack port 33.

A locking body 24 of the device 10 (FIG. 2) has a lower section 25 that has a protrusion extending from a bottom face 16 thereof. The protrusion can take the form, for example, of a downwardly extending ridge 26. The ridge 26 is dimensioned for, when the locking body's lower section 25 is inserted into the jack body's aperture 14, snapping past the plug section's ridge 19, and snapping into the valley 20. Once thus positioned, the elements are dimensioned so that the locking body 24 cannot be removed from the aperture 14 without being destroyed.

The locking body 24 has an upper section 27 that is dimensioned so that a distal portion 28 thereof is extendible between the jack body's plug section 12 and the spring element's proximal end 23. The upper section 27 is also dimensioned so that, when so positioned, a depression of the spring element 21 that is sufficient to release the plug section 12 from the jack port 33 is prevented. A notch 29 extends from a distal end 30 between the lower section 25 and the upper section 27 and is dimensioned to admit the plug section's upper wall 16.

In use (FIG. 3), the locking body's lower section 25 is insertable into the plug section's aperture 14, and the lower section's ridge 26 is snappable over the plug portion's ridge 19 so as to prevent a removal of the locking body 24 from the plug section's aperture 14. In this position, the notch 29 is positioned to encompass a portion of the plug section's upper wall 16, and the locking body's upper section 27 is positionable between the plug section's upper wall 16 and the spring element 21, so as to prevent a removal of the jack body 11 from a jack port 33.

The jack port 33 may be of the type that is in signal communication with a network 36 monitored by a processor 37. A connection or lack thereof between the contacts 34,35 can thereby be monitored by the processor 37. For example, the device 10 can include an electronic pollable sensor 38 monitored by hardware or software on the network 36 that can indicate a loss of signal or connection to the device 10, indicating that the device 10 has been compromised.

A method of the present invention for preventing unauthorized access to a jack port includes providing a device 10 such as described above. The device 10 will typically be provided as a plurality of devices, each bearing indicia 31 thereon (FIG. 4). A matching indicium 32 can be provided for affixing to the jack port 33 into which the device 10 is inserted. As discussed above, the device 10, once inserted into a jack port 33, cannot be removed without destroying the device 10.

In use, security personnel can monitor jack ports 33 to ensure that none of the devices 10 has been removed, and ascertain that the indicia 31,32 at each jack port 33 match. The processor 37 can also monitor jack ports 33 via the network 36 to ensure that none of the devices 10 has been removed with the use, for example, of the sensor 38.

In another embodiment (FIG. 5), believed at the time of filing to represent the best mode, the device 60 includes a base 61 having a top 62 and two sides 63. Each side 63 has an upper edge 64 meeting a side edge 65 of the top 62 and a longitudinal slot 66 therein open at a front end 67 and terminating forward of a rear edge 68 of the respective side 63. Each slot 66 communicates with a base inner space 69 defined by the top 62 and two sides 63 and has a bottom edge 70 that is substantially parallel with the respective side upper edge 64. A protrusion 71 extends upwardly from the slot's bottom edge 70 into the slot 66 in spaced relation from a respective side front edge 72.

The top 62 is downwardly compressible relative to the sides 63 so that the slot 66 has a first width in a released position and a second width less than the first width in a compressed position. A back end 73 of the slot 66 is widened for facilitating access thereto by a cutting device for removing the device 60 from a port 33.

The base 61 further comprises a bracing element 74 extending laterally through the inner space 69 in bridging relation to the two sides 63 for providing stability to the device 60.

A ramped element 75 is positioned atop the base top 62 and has a first height at a front end 76 adjacent a front edge 77 of the base top 62 and a second height at a back end 78 thereof in spaced relation from the base top's front edge 77. The second height is greater than the first height, and the back end 78 is substantially aligned vertically with the slot protrusion 71. The ramped element's back end 78 has a rear face 79 that is substantially perpendicular to the base top 62. The ramped element's back end 78 is in spaced relation from the base top 62 and is compressible theretoward with the top 62 in the compressed position.

A stop element 80 is also positioned atop the base top 62. The stop element 80 has a third height greater than the second height, and is positioned rearward of and in spaced relation from the ramped element 75. The stop element 80 comprises a substantially rectangular element 81 positioned substantially perpendicular to the base top 62 and is dimensioned to substantially cover the port 33 when the device 60 is retained therein. The stop element 80 further comprises a triangular brace 82 positioned with a front face 83 against a rear face 84 of the rectangular element 81 and a bottom face 85 against the base top 62, with a substantial right angle between the rectangular element's rear face 84 and the base top 62.

A front portion of the device 60 in the compressed position is dimensioned for insertion into a target port 33 to a sufficient distance that the ramped element 75 is retained within the port 33 when device 60 is in the released position. When the device 60 is retained within the port 33, the slot's upward protrusion 71 prevents sufficient slot compression to remove the device 60 from the port 33, and the stop element 80 is positioned to prevent access into the port 33. Preferably, the device 60 is removable from the port 33 only by destroying the device's integrity, such as by cutting through the sides 63 adjacent the slot's back end 73.

Indicia in the form of a serial number 86 can again be provided for tracking purposes, the serial number 86 unique to a particular device 60. For example, a particular site could be provided with a plurality of devices 60, each having a different serial number 86, so that a device 60 could not be destroyed and then replaced without substituting a device 60 having a different serial number 86, thereby indicating tampering.

As above, tampering can also be monitored with the use of a sensor in signal communication with a network monitored by a processor, for indicating a loss of integrity in the device's signal.

In yet another embodiment (FIG. 6), the device 90 comprises a one-piece element that does not interface with a jack 11. This embodiment 90 comprises a base 91, the shape here being shown as a substantially rectinlineal, solid element suitable for grasping. This shape is to be understood by one of skill in the art as exemplary, and a person of skill in the art could envision many different shapes therefor.

A distal portion 92 of the device 90 comprises a dual-prong element having a generally "U" shape in side cross-section, with an upper 93 and a lower 94 portion separated by a first distance 95 to which the upper 93 and lower portions 94 are biased. The terms "upper" and "lower" are merely used for ease of visualization, since the device 92 can be symmetrical, and, in this case, be insertable into a jack port in either orientation. The distal portion 92 further comprises an outwardly flaring wing 96 extending away from each of the upper 93 and the lower 94 wing. The wings 96 are biased to the outwardly flaring configuration. The upper 93 and lower 94 portions further have an outer surface 97 that is inwardly stepped 98 proximal of a proximal end 99 of the wings 96.

The upper 93 and lower 94 portions and the wings 96 together are dimensioned and have sufficient compressibility for insertion into a jack port by forcing the upper 93 and lower 94 portions closer together, and forcing the wings 96 closer to the stepped portion 98 of the upper 93 and lower 94 portions. The biasing of these elements 93,94,96 causes them to open upon entering the port, so that the wings 96 retain the device 90 within the port like a barb. The device 90 then cannot be removed from the port without being broken. A serial number 100 can again be provided for tracking purposes.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A device for securing a jack or a data port against access comprising:
   a base having a top and two sides, each side having an upper edge meeting a side edge of the top, each side further having a longitudinal slot therein open at a front end and terminating forward of a rear edge of the respective side, each slot communicating with a base inner space defined by the top and two sides, each slot having a bottom edge substantially parallel with the respective side upper edge, with a protrusion extending upwardly from the slot bottom edge into the slot in spaced relation from a respective side front edge, the top downwardly compressible wherein the slot has a first width in a released position and a second width less than the first width in a compressed position;
   a ramped element atop the base top, the ramped element having a first height at a front end joined to the base top adjacent a front edge thereof and a second height rearward of the front edge, the second height greater than the first height, at least a portion of the ramped element rearward of the front edge aligned vertically with the slot protrusion; and
   a stop element atop the base top having a third height greater than the second height, the stop element positioned rearward of and in spaced relation from the ramped element; wherein:
   a front portion of the device in the compressed position is dimensioned for insertion into a target port to a sufficient distance that the ramped element is retained within the port when the device is in the released position; and
   when the device is retained within the port, the slot protrusion prevents sufficient slot compression to remove the device from the port and the stop element is positioned to prevent access into the port, the device removable from the port only by destroying an integrity thereof.

2. The device recited in claim 1, wherein the base further comprises a bracing element extending laterally through the inner space in bridging relation to the two sides for providing stability to the device.

3. The device recited in claim 1, wherein the base further comprises an indicium applied thereto, the indicium unique to a particular device.

4. The device recited in claim 1, wherein a back end of the slot is widened for facilitating access thereto by a culling device for removing the device from a port.

5. The device recited in claim 1, wherein the ramped element back end has a rear face substantially perpendicular to the base top.

6. The device recited in claim 1, wherein the ramped element back end is in spaced relation from the base top and is compressible theretoward with the top in the compressed position.

7. The device recited in claim . wherein the stop element comprises a substantially rectangular element positioned substantially perpendicular to the base top and dimensioned to substantially cover the port when the device is retained therein.

8. The device recited in claim 7, wherein the stop element further comprises a triangular brace positioned with a front face against a rear face of the rectangular element and a bottom face against the base top, a substantial right angle between the rectangular element rear face and the base top.

9. The device recited in claim 1, further comprising a sensor operatively associated with the base, the sensor comprising means for being polled electronically over a network in signal communication with the port, the polling for determining a presence of the device in the port.

10. A method of securing a jack or a data port against access comprising the step of inserting a front portion of a device in a compressed position into a target port, the device having a ramped element atop a device top, and a compressible longitudinal slot in each of two opposed sides, each slot open at a front end, the device inserted by compression to reduce a width of the slot and inserted to a sufficient distance that the ramped element is retained within the port when the device is in a released position wherein the slot is released from compression, the device restrained from further compression when retained within the port, the device having a stop element thereatop positioned rearward of and in spaced relation from the ramped element for preventing access into the port from a position external the port, the device removable from the port only by destroying an integrity thereof.

11. The method recited in claim 10, wherein the base further comprises an indicium applied thereto, the indicium unique to a particular device, and further comprising the step of ascertaining a tampering with the device by checking that a device having an appropriate indicium is positioned within the port.

12. The method recited in claim 10, wherein:
the device comprises a protrusion extending upwardly from a bottom edge of the slot into the slot in spaced relation from the front end thereof;
the ramped element has a first height at a front end joined to the base top adjacent a front edge thereof and a second height rearward of the front edge, the second height greater than the first height, at least a portion of the ramped element rearward of the front edge aligned vertically with the slot protrusion;
the stop element is positioned atop the base top and has a third height greater than the second height; and
the device is restrained from further compression when retained within the port by the slot protrusion acting to prevent sufficient slot compression to remove the device from the port.

13. The method recited in claim 12, wherein the base further comprises a bracing element extending laterally through the inner space in bridging relation to the two sides for providing stability to the device.

14. The method recited in claim 12, wherein a back end of the slot is widened for facilitating access thereto by a cuffing device for removing the device from a port.

15. The method recited in claim 12, wherein the ramped element back end has a rear face substantially perpendicular to the base top.

16. The method recited in claim 12, wherein the ramped element back end is in spaced relation from the base top and is compressible theretoward with the top in the compressed position.

17. The method recited in claim 12, wherein the stop element comprises a substantially rectangular element positioned substantially perpendicular to the base top and dimensioned to substantially cover the pod when the device is retained therein.

18. The method recited in claim 17, wherein the stop element further comprises a triangular brace positioned with a front face against a rear face of the rectangular element and a bottom face against the base top, a substantial right angle between the rectangular element rear face and the base top.

19. The method recited in claim 10, further comprising the step of electronically polling a sensor operatively associated with the device for determining a presence of the device in the port, the sensor polled over a network in signal communication with the port.

20. A device for securing a jack or a data pod against access having a top and a longitudinal slot in each of a pair of opposed sides thereof the slots each open at a front end and terminating forward of a rear edge of the respective side, each slot communicating with a base inner space defined by the top and the opposed sides; and comprising:
a protrusion extending into the slot in spaced relation from a device front edge, the device compressible wherein the slot has a first width in a released position and a second width less than the first width in a compressed position, an amount of compression limited by the protrusion;
a ramped element atop the device top, the ramped element having a first height at a front end joined to the device top adjacent a front edge thereof and a second height rearward of the front edge, the second height greater than the first height; and
a stop element atop the device top having a third height greater than the second height, the stop element positioned rearward of and in spaced relation from the ramped element; wherein:
a front portion of the device in the compressed position is dimensioned for insertion into a target port to a sufficient distance that the ramped element is retained within the port when the device is in the released position; and
when the device is retained within the port, the protrusion prevents sufficient slot compression to remove the device from the port and the stop element is positioned to prevent access into the port, the device removable from the pod only by destroying an integrity thereof.

* * * * *